US008238866B2

(12) United States Patent
Morris

(10) Patent No.: US 8,238,866 B2
(45) Date of Patent: Aug. 7, 2012

(54) FILTERING COMMUNICATIONS CHANNELS WITHIN TELECOMMUNICATIONS SATELLITES

(75) Inventor: Ian Morris, Stevenage (GB)

(73) Assignee: Astrium Limited, Hertfordshire (GB)

( * ) Notice: Subject to any disclaimer, the term of this patent is extended or adjusted under 35 U.S.C. 154(b) by 229 days.

(21) Appl. No.: 12/810,954

(22) PCT Filed: Dec. 19, 2008

(86) PCT No.: PCT/EP2008/068033
§ 371 (c)(1),
(2), (4) Date: Jun. 28, 2010

(87) PCT Pub. No.: WO2009/083499
PCT Pub. Date: Jul. 9, 2009

(65) Prior Publication Data
US 2010/0285761 A1 Nov. 11, 2010

(30) Foreign Application Priority Data

Dec. 28, 2007 (EP) .................................... 07270081
Dec. 28, 2007 (GB) .................................... 0725251.3

(51) Int. Cl.
*H04B 1/10* (2006.01)
*H04B 1/16* (2006.01)
(52) U.S. Cl. ...................... 455/307; 455/177.1; 455/340
(58) Field of Classification Search .................. 455/307, 455/339, 340, 188.1, 12.1, 213, 306, 177.1
See application file for complete search history.

(56) References Cited

U.S. PATENT DOCUMENTS

| 2,998,517 A | 8/1961 | Beckerich |
| 3,008,043 A | 11/1961 | Caulk |
| 4,228,401 A | 10/1980 | Wachs et al. |
| 4,262,361 A | 4/1981 | Hauer |

(Continued)

FOREIGN PATENT DOCUMENTS

| WO | WO 2006/043115 A1 | 4/2006 |
| WO | WO 2006/085116 A1 | 8/2006 |

OTHER PUBLICATIONS

International Search Report dated Mar. 4, 2009.
Written Opinion of the International Searching Authority dated Mar. 4, 2009.
European Search Report dated Jun. 12, 2008.

(Continued)

*Primary Examiner* — Sonny Trinh
(74) *Attorney, Agent, or Firm* — Buchanan Ingersoll & Rooney PC

(57) ABSTRACT

A variable bandwidth filter for use in filtering signal channels in a telecommunication satellite between uplink and downlink beams, and having a reduced amount of phase noise, includes a first mixer for translating the frequency of an input signal by a first predetermined frequency value, a first filter for defining one edge of the variable bandwidth, a second mixer for translating the frequency of the input signal by a second predetermined frequency value, a second filter for defining another edge of the variable bandwidth, and further mixer for translating the frequency of the input signal by a further predetermined frequency value, and wherein first and second local oscillator frequencies are applied to the first mixer, the second mixer and the further mixer such that each frequency translation of the input signal in one direction has a counterpart translation of corresponding value in the opposite direction.

20 Claims, 3 Drawing Sheets

U.S. PATENT DOCUMENTS

| | | | | |
|---|---|---|---|---|
| 4,777,449 | A | * | 10/1988 | O'Connor ............... 329/323 |
| 4,888,502 | A | * | 12/1989 | Jarrett .................... 327/553 |
| 6,054,908 | A | * | 4/2000 | Jackson ................. 333/174 |
| 6,801,102 | B2 | * | 10/2004 | Shamsaifar et al. ...... 333/174 |
| 6,957,054 | B2 | * | 10/2005 | Li .......................... 455/296 |
| 7,034,636 | B2 | * | 4/2006 | Shamsaifar et al. ...... 333/174 |
| 7,283,800 | B2 | * | 10/2007 | Li .......................... 455/323 |
| 7,890,072 | B2 | * | 2/2011 | Chen et al. ............ 455/226.1 |
| 2003/0027534 | A1 | | 2/2003 | Swazey |
| 2004/0002317 | A1 | | 1/2004 | Busking |

OTHER PUBLICATIONS

United Kingdom Search Report dated Mar. 26, 2008.
Notification Concerning Transmittal of International Preliminary Report on Patentability (Forms PCT/IB/326 and PCT/IB/373) and the Written Opinion of the International Searching Authority (Forms PCT/ISA/237) issued in corresponding International Application No. PCT/EP2008/068033 dated Jul. 8, 2010.

* cited by examiner

FILTERING COMMUNICATIONS CHANNELS WITHIN TELECOMMUNICATIONS SATELLITES

FIELD OF THE INVENTION

The present invention relates to a means of filtering of communications channels between uplink and downlink beams within telecommunications satellites.

BACKGROUND ART

WO 2006/043115 discloses a cost-effective analog mechanism that enables flexibility in the routing of channels between uplink and downlink beams, wherein all uplink channels from a variety of microwave bands are converted to a first intermediate frequency ("IF"), and agile filters are employed to filter and translate selected channels to a second IF, in order to group the selected channels together for transmission on a downlink beam.

WO 2006/085116 and U.S. Pat. No. 4,262,361 disclose a form of agile filter having a continuously variable bandwidth which includes a local oscillator and mixers for adjusting the position of an input signal relative to bandpass filter edges. A problem with the techniques disclosed in the above documents is that where a large number of agile filters is required for channel routing, this introduces a great amount of phase noise.

SUMMARY OF THE INVENTION

It is an object of the invention to provide an analog mechanism for providing flexibility in the routing of channels between uplink and downlink beams in a telecommunications satellite, wherein problems of phase noise are avoided or reduced.

The present invention provides a variable bandwidth filter, comprising a first mixer for translating the frequency of an input signal by a first predetermined frequency value, a first filter for defining one edge of said variable bandwidth, a second mixer for translating the frequency of the input signal by a second predetermined frequency value, a second filter for defining another edge of said variable bandwidth, and further mixer means for translating the frequency of the input signal by a further predetermined frequency value, and including local oscillator means for providing a first local oscillator frequency to said first mixer and said further mixer means, and a second local oscillator means for providing a second local oscillator frequency to said second mixer and said further mixer means, whereby each frequency translation of the input signal in one direction has a counterpart translation of corresponding value in the opposite direction.

The present invention recognises that the greater part of phase noise in a variable bandwidth filter originates from local oscillators and that, by ensuring that each frequency translation of the input signal by a local oscillator signal is mirrored by a frequency translation from essentially the same local oscillator signal in the opposite direction, phase noise from the local oscillator signal will essentially be cancelled.

As preferred, said first and second local oscillator means are provided by a single oscillator circuit, which is coupled to first frequency synthesiser means for providing said first local oscillator frequency, and is coupled to second frequency synthesiser means for providing said second local oscillator frequency; this enables economy in parts count and reduces sources of phase noise. The single oscillator circuit may include a crystal to achieve high absolute frequency accuracy and a voltage controlled oscillator ("VCO") locked to a multiple of the frequency. Although the VCO is spectrally pure it will drift with time. A control loop scheme is provided for locking the VCO and the "tracking bandwidth" of this loop determines how much of the phase noise gets through.

Said frequency synthesiser means preferably comprises fractional 'N synthesisers. It is preferred for convenience to provide for each of the first and second frequencies a single synthesiser, each synthesiser providing the same signal to the respective first or second mixer and to the further mixer means.

As regards the further mixer means, this may comprise one or more mixer circuits, as described below. The construction of each mixer may take any convenient form, for example a diode bridge.

Appropriate delay means, for example delay line lengths, may be inserted in the signal paths of the first and second frequencies to ensure that the signal translation of the input signal which mirrors a previous translation of the input signal takes place with versions of a local oscillator signal that are synchronised in time. The precise values of the first and second local oscillator frequencies may have any desired value, and will be chosen depending on the precise characteristics of the first and second filters and the requirement to avoid intermodulation products that cause interference. In a particularly preferred embodiment, the values of the first and second local oscillator frequencies are selected to be equal. This enables significant savings in hardware costs in that only one fractional 'N synthesiser may be required. Alternatively, two identical subunits may be provided, each including synthesiser and mixer, to make up the variable bandwidth filter.

BRIEF DESCRIPTION OF THE DRAWINGS

Preferred embodiments of the invention will now be described with reference to the accompanying drawings wherein:—

DESCRIPTION OF THE PREFERRED EMBODIMENTS

Current arrangements for routing channels between uplink and downlink beams in communications satellites employ independent local oscillators to derive channel position and channel bandwidth whilst also providing an overall net frequency translation. In so doing, there is no opportunity to cancel the phase noise contributions. The preferred embodiments of the invention provide a way of retaining flexible bandwidth functionality, whilst reducing phase noise and hardware count. The invention may offer a way of including the bandwidth variability as a standalone function which can be added to the overall channel routing design if and when a mission requires it. The preferred embodiments rely on using local oscillators in a way which removes phase noise, by using the same frequencies for up conversion and down conversion.

Figure 1:
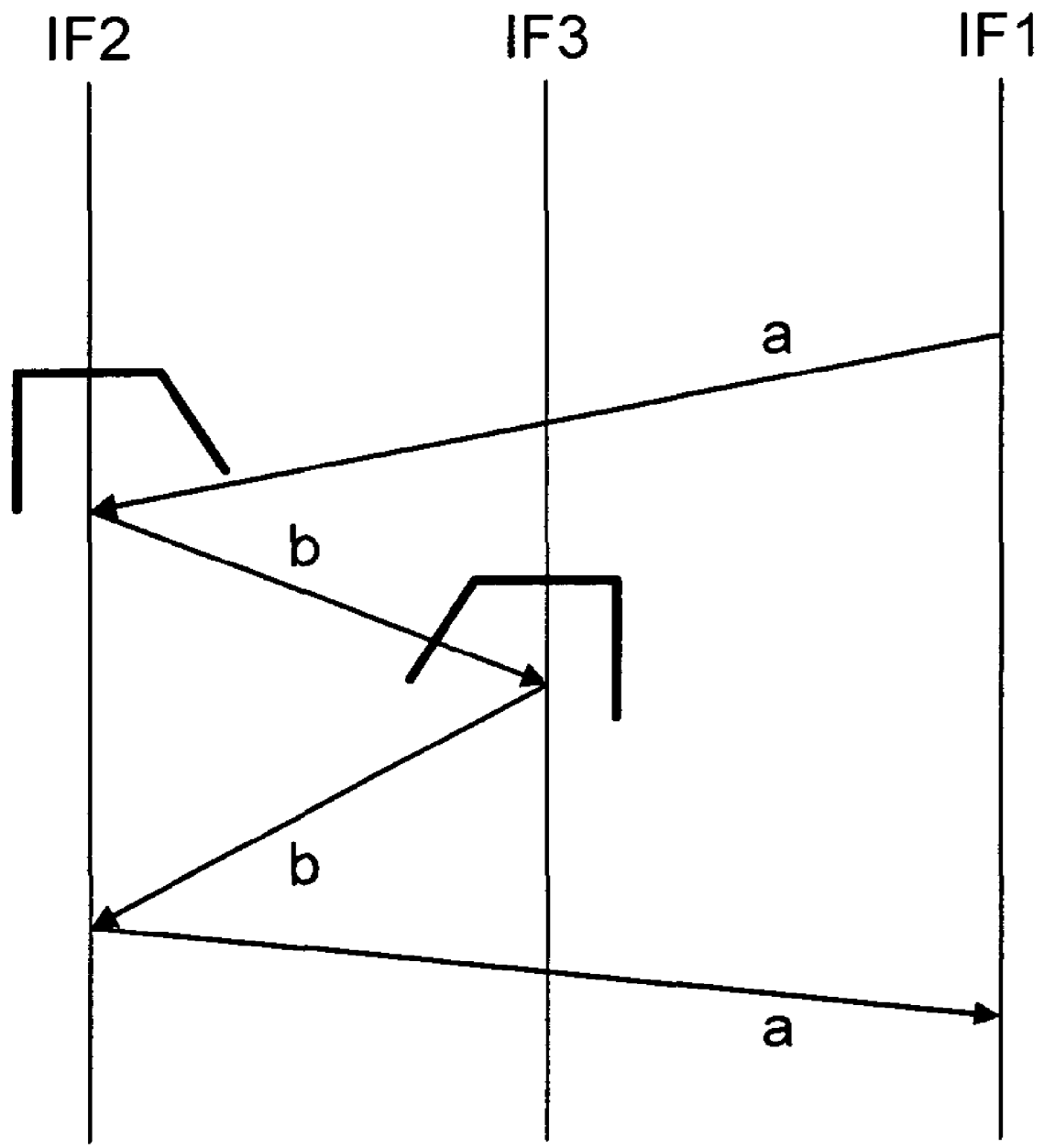
FIG. 1 is a schematic diagram illustrating the concept of the present invention.

The conversion plan proposed is shown in FIG. 1. The IF1 line represents the common input and output frequencies for the overall current routing design. As can be seen, the plan is overall non-translating. IF2 and IF 3 are intermediate frequencies which are chosen to minimise spurious products.

The variable bandwidth function is formed by converting the channel frequency to IF2 by means of a frequency translation "a", and using a low-pass filter at IF2 to define an upper edge of the bandwidth of the filter. A further frequency translation "b" moves the channel to IF3 and a high-pass filter at IF3 defines the lower edge of the variable bandwidth. Conversion "b" sets the overlap of the two filters, i.e. the width of the passband. After filtering at IF3, the channel filtering is complete and the channel is returned to the IF1 frequency band by further frequency translations −"a" and +"b".

In alternative arrangements, translation "a" may be smaller in value than translation "b", and the filter at IF2 may be a high-pass filter, and that at IF3 a low-pass filter. In a particularly preferred arrangement, the values of a and b may be numerically equal; this permits savings in hardware costs.

Figure 2:
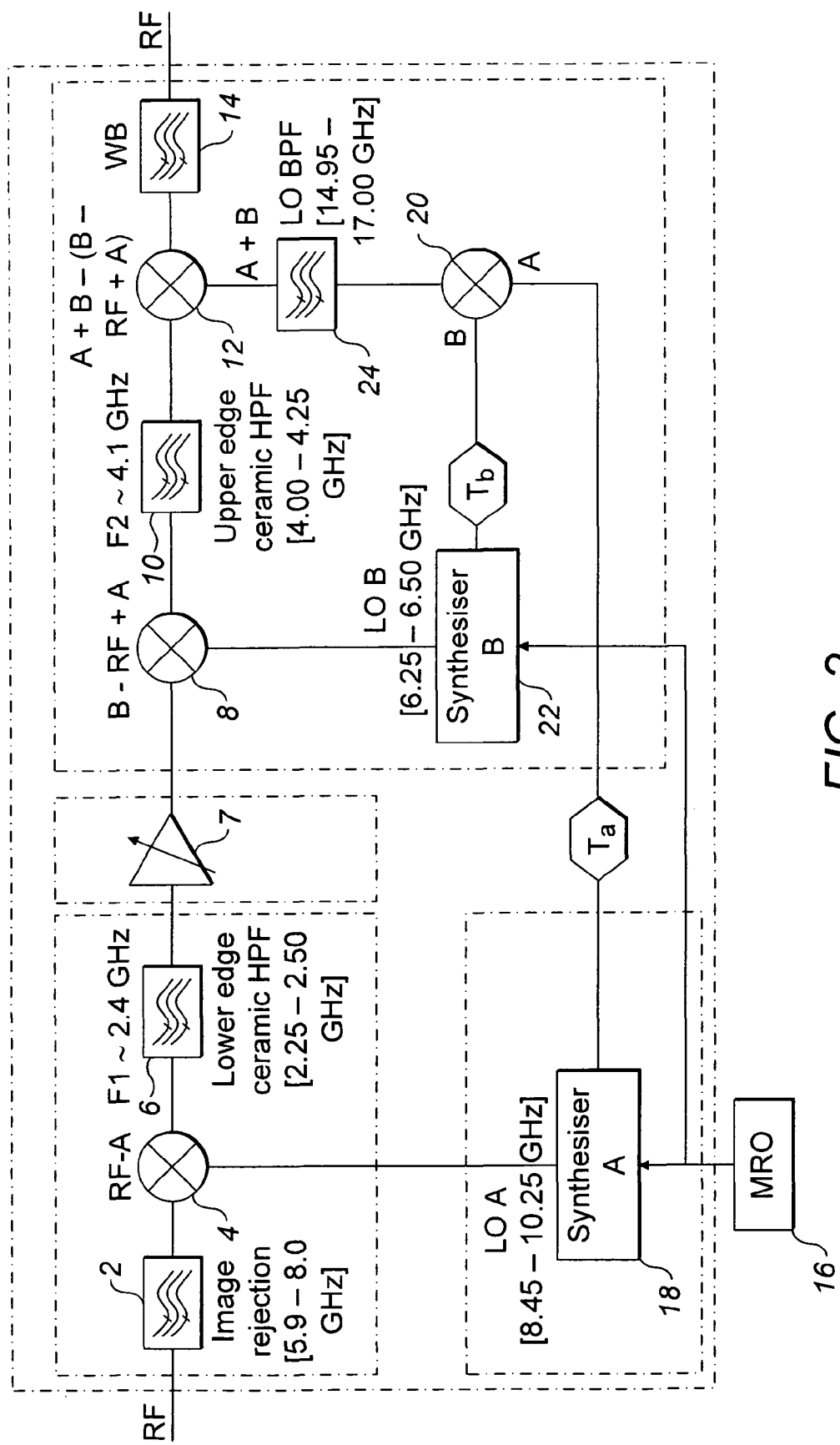
FIG. 2 is a schematic block diagram of a first embodiment of the invention.

In the first embodiment of the invention, as shown in FIG. 2, the final conversion from IF3 to IF1 does not go via IF2 but is formed by a direct conversion (a-b) still retaining the cancellation properties. In FIG. 2, an input channel signal RF at IF1 (the input frequency range (IF1) is between 10.7 GHz and 12.75 GHz) is filtered by an image rejection filter 2 (5.9-8.0 GHz), mixed in a first mixer 4 with a first local oscillator frequency A, filtered in a high pass ceramic filter 6, amplified in a variable gain amplifier 7, mixed in a second mixer 8 with a second local oscillator frequency B, filtered in a low pass ceramic filter 10, mixed in a further mixer 12 with a combined local oscillator signal A+B, and then filtered through a wideband filter 14 to provide an output signal. Thus elements 2-14 are coupled in series in the signal path for the input signal RF.

The band shaping filters 6, 10 are at 2.4 GHz (more accurately there is a roll-off from 2.25 to 2.5 GHz) and 4 GHz (with a roll-off between 4.00 and 4.25 GHz). A master local oscillator 16 is coupled to a first fractional 'N synthesiser 18 which provides a first local oscillator frequency A at frequencies between 8.45 and 10.25 GHz to mixer 4, and to a further mixer 20. Oscillator 16 is coupled to a second fractional 'N synthesiser 22 which provides a second local oscillator frequency B at frequencies between 6.25 and 6.5 GHz to mixer 8, and to further mixer 20. Mixer 20 provides a combined signal A+B via a band pass filter 24 (14.95-17.00 GHz) to further mixer 12. Delay lines Ta and Tb are provided in the signal paths from synthesisers 18, 22 to mixer 20, in order to match path lengths to allow optimum phase noise cancellation.

In operation, the modulation product RF−A is extracted from the mixer and applied to filter 6, for defining the lower bandpass edge. The filtered signal RF−A is applied to mixer 8, and the modulation product B−RF+A is extracted and applied to filter 12, for defining the upper bandpass edge. The filtered version of B−RF+A is applied to mixer 12, where the modulation product of A+B−(B−RF+A) is extracted, which represents the filtered version of the input signal RF.

Figure 3:
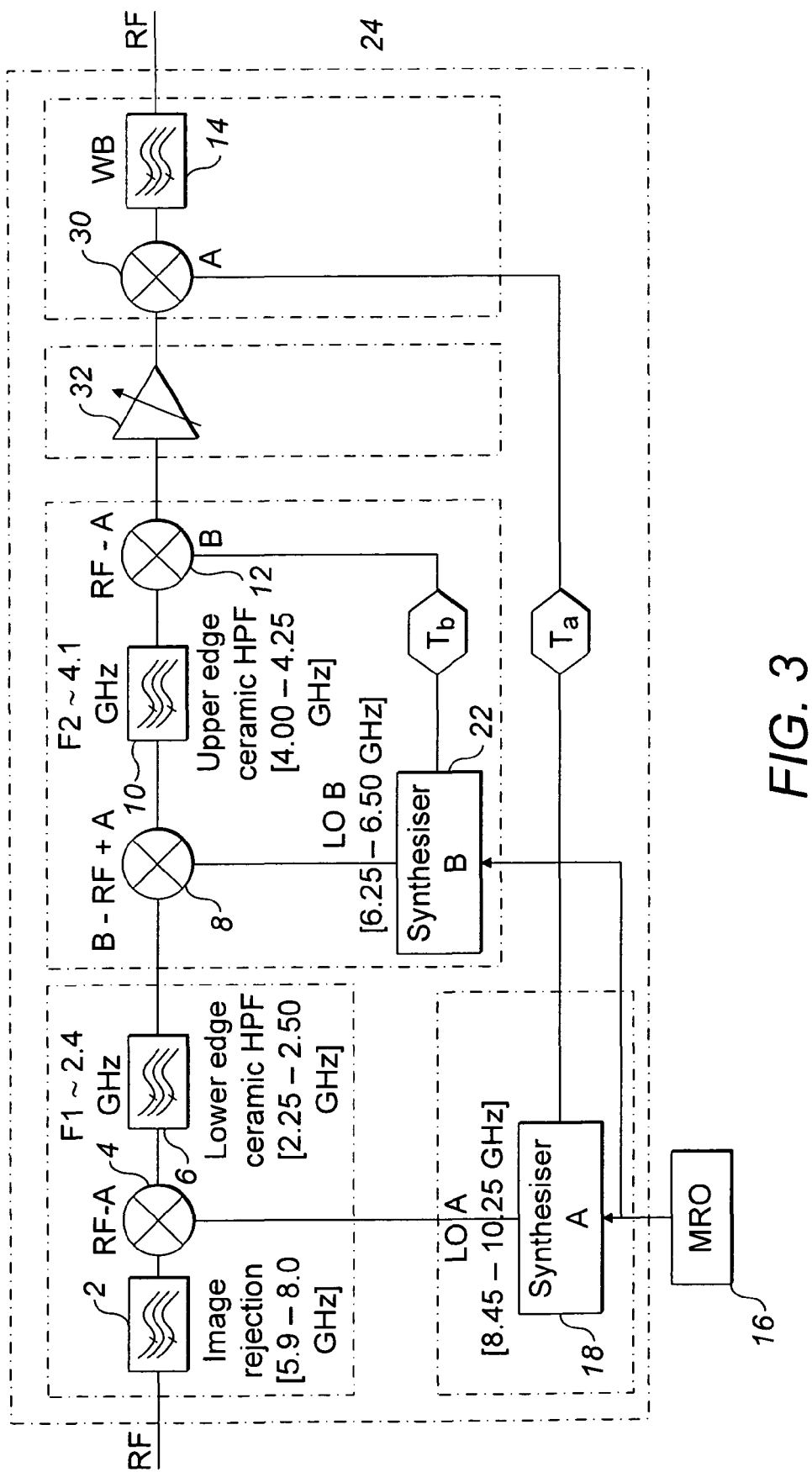
FIG. 3 is a schematic block diagram of a second embodiment of the invention.

The approach of the second embodiment shown in FIG. 3 is to take the conceptual "M" conversion shape of FIG. 1 completely and have individual conversion for each stage. In FIG. 3, similar parts to those of FIG. 2 are denoted by the same reference numeral. It may be seen that a major difference is that mixer 20 of FIG. 2 has been omitted, and that a further mixer 30 is provided in the input signal path, following a signal gain amplifier 32. Thus mixer 12 operates to translate the frequency of the input signal by B, and mixer 30 operates to translate the frequency of the input signal by A.

In a variation, the values of local oscillator frequencies A and B are equal. This permits savings in hardware costs in that, for example, the circuit may be composed of two identical sub-units, each including a mixer and a synthesiser.

The invention claimed is:

1. A variable bandwidth filter, comprising:
   a first mixer for translating the frequency of an input signal by a first predetermined frequency value to provide a first output signal;
   a first filter for defining one edge of said variable bandwidth, the first filter being applied to the first output signal;
   a second mixer for translating the frequency of the filtered first output signal by a second predetermined frequency value to provide a second output signal;
   a second filter for defining another edge of said variable bandwidth, the second filter being applied to the second output signal;
   further mixer arrangement for translating the frequency of the filtered second output signal by a further predetermined frequency value, wherein said further mixer arrangement provides a counterpart frequency translation corresponding to each of said first and second predetermined frequency values; and
   a local oscillator arrangement for providing a first local oscillator frequency to said first mixer and to said further mixer arrangement, and a second local oscillator frequency to said second mixer and to said further mixer arrangement.

2. A filter according to claim 1, including an oscillator circuit, which is coupled to a first frequency synthesiser for providing said first local oscillator frequency, and which is coupled to a second frequency synthesiser for providing said second local oscillator frequency.

3. A filter according to claim 2, wherein the oscillator circuit includes a crystal and a control loop including a voltage controlled oscillator which is locked to a harmonic of the frequency of the crystal.

4. A filter according to claim 3, wherein the first frequency synthesiser comprises a fractional 'N synthesiser.

5. A filter according to claim 3, wherein the second frequency synthesiser comprises a fractional 'N synthesiser.

6. A filter according to claim 3, including delay means inserted in the signal paths of the first and/or second local oscillator frequencies for equalising signal path delays.

7. A filter according to claim 3, wherein said further mixer arrangement includes a mixer arranged to mix the input signal with a combined version of the first and second local oscillator frequencies.

8. A filter according to claim 2, wherein the first frequency synthesiser comprises a fractional 'N synthesiser.

9. A filter according to claim 8, wherein the second frequency synthesiser comprises a fractional 'N synthesiser.

10. A filter according to claim 8, including delay means inserted in the signal paths of the first and/or second local oscillator frequencies for equalising signal path delays.

11. A filter according to claim 8, wherein said further mixer arrangement includes a mixer arranged to mix the input signal with a combined version of the first and second local oscillator frequencies.

12. A filter according to claim 2, wherein the second frequency synthesiser comprises a fractional 'N synthesiser.

13. A filter according to claim 12, including delay means inserted in the signal paths of the first and/or second local oscillator frequencies for equalising signal path delays.

14. A filter according to claim 2, including delay means inserted in the signal paths of the first and/or second local oscillator frequencies for equalising signal path delays.

15. A filter according to claim 2, wherein said further mixer arrangement includes a mixer arranged to mix the input signal with a combined version of the first and second local oscillator frequencies.

16. A filter according to claim 1, including delay means inserted in the signal paths of the first and/or second local oscillator frequencies for equalising signal path delays.

17. A filter according to claim 1, wherein said further mixer arrangement includes a mixer arranged to mix the input signal with a combined version of the first and second local oscillator frequencies.

18. A filter according to claim 1, wherein said further mixer arrangement includes a third mixer arranged to mix the input signal with the first local oscillator frequency, and a fourth mixer arranged to mix the input signal with the second local oscillator frequency.

19. A filter according to claim 1, wherein the values of said first and second local oscillator frequencies are equal.

20. A filter according to claim 1, incorporated in a channel routing arrangement between uplink and downlink beams in a telecommunications satellite.

* * * * *